United States Patent Office 3,513,140
Patented May 19, 1970

3,513,140
CRYSTALLINE COPOLYMERS
James Keith Hambling, Frimley, near Aldershot, Hampshire, Great Britain, and David Allinson Woodhead, Shepperton, Middlesex, Northern Ireland, assignors to The British Petroleum Company Limited, London, England, a corporation of England
No Drawing. Filed Nov. 22, 1967, Ser. No. 684,933
Claims priority, application Great Britain, Nov. 29, 1966, 53,404/66
Int. Cl. C08f *15/40*
U.S. Cl. 260—80.78    3 Claims

ABSTRACT OF THE DISCLOSURE

Transparent crystalline polymers of improved tensile strength and malleability contain units derived from a branched chain monoolefin of 4–6 carbon atoms and at least some but less than 5% of units derived from at least one branched chain alpha octene. The polymers may be prepared by polymerising the branched $C_{4-6}$ monoolefin with the branched chain alpha octene in the presence of a catalyst obtained from (a) a solid crystalline compound of a metal selected from Groups IV, V, VI, VII or VIII, the metal being in a lower valency state than its maximum and (b) an organometallic compound of a metal selected from Groups I, II or III.

---

This invention relates to a process for the production of crystalline copolymers and to the copolymers themselves.

According to the present invention there is provided a process for the production of a crystalline copolymer which process comprises polymerising a branched chain alpha mono-olefin containing 4–6 carbon atoms per molecule with at least one branched chain alpha octene in the presence of a catalyst obtained from (a) a solid crystalline compound of a metal selected from Groups IV, V, VI, VII or VIII of the Periodic Table according to Mendeleef, the metal being in a lower valency state than its maximum and (b) an organo-metallic compound of a metal selected from Groups I, II or III of the table.

Preferably the feedstock contains from 50 to 90% by volume of the $C_{4-6}$ olefin and from 10 to 50% by volume branched chain octenes.

A very suitable $C_{4-6}$ olefin is 4-methylpentene-1.

A very suitable source of branched chain octenes is that fraction obtained as a distillation cut between 110° C. and 111.5° C. from the base products of a butene-ethylene codimerisation process. A suitable ethylene-butene codimerisation process is described in our British Pat. No. 962,255.

Preferably the crystalline compound is a halide of a transition element. Most preferably it is titanium trichloride.

Preferably the organo-metallic compound is a compound of aluminium and most preferably an alkyl aluminium halide. The preferred alkyl aluminium halide is aluminium diethyl monochloride.

Preferably the molar ratio of component (a) of the catalyst to component (b) is in the range 1:1 to 1:10., most preferably in the range 1:1 to 1:4.

Polymerisation may be effected in the presence of an inert diluent which is a non-solvent for component (a) of the catalyst. Suitable diluents include normally liquid hydrocarbons, for example, heptane, octane, benzene, toluene and xylene.

Polymerisation may be carried out in the absence of solvents for the monomers whilst maintaining the monomers in the liquid state if desired.

Preferably polymerisation is carried out at a temperature in the range −20° to +120° C., most preferably in the range 20 to 90° C.

Preferably the concentration of component (a) of the catalyst lies between 0.1 and 50, most preferably between 0.5 and 30 millimoles per litre of reaction medium.

The pressure may be sub-atmospheric, atmospheric or super-atmospheric.

By reason of the different reactivities of the $C_{4-6}$ olefins and the $C_8$ olefins, only minor amounts, less than 5% by weight, of octenes can be incorporated into the copolymers.

Nevertheless, the presence of the octenes has been found to have a beneficial effect on the course of the copolymerisation reaction and the presence of units derived from the octenes has been found to produce copolymers having physical properties superior in many ways to homopolymers of 4-methylpentene-1.

The octenes control the molecular weight of the copolymers to a considerable extent and, indeed, result in the production of copolymers whose molecular weights are sufficiently low to permit them to be processed by injection moulding without degradation.

If, however, the preparation of an easily extrudable copolymer is desired, then it is necessary to effect copolymerisation in the presence of an additional molecular weight control agent, e.g., hydrogen.

In general, Ziegler-type polymerisations are carried out in the presence of an inert diluent. If, however, the quantity of diluent is reduced or eliminated then the rate of reaction is increased.

The presence of the octenes reduces the rate of the reaction in the present process. This may not be a desired effect. However, by operating with reduced quantities or in the absence of a diluent, the rate reducing effect of the octenes is counter-balanced by the rate increasing effect of reduced diluent concentration and normal reaction rates can be achieved.

Insofar as the polymers themselves are concerned, the presence of units derived from the octenes confers a marked increase in tensile strength and malleability, especially at elevated temperature, when compared with homopolymers of 4-methylpentene-1.

The copolymers are clear, transparent, colourless materials. Thus according to another aspect of the present invention there is provided a crystalline copolymer containing units derived from a branched chain alpha mono-olefin containing 4–6 carbon atoms per molecule and at least some but less than 5% of units derived from at least one branched chain alpha octene.

The invention is illustrated by the following example.

EXAMPLE

A copolymer of 4-methylpentene-1 and a mixture of branched chain alpha octenes was prepared as follows:

A 5 l. 5-neck glass reactor was fitted with a paddle stirrer, thermometer pocket, cold finger and suitable catalyst/monomer entry tubes.

The reactor was placed in an oil bath, urged with dry nitrogen and charged with 1600 ml. 4MP1 and 400 ml. of a branched octene distillation cut (110° C.–111.5° C.) ex butee-ethylene codimerisation process.

3.5 g. of titanium trichloride and 6.5 g. aluminium diethyl monochloride were washed in with 135 ml. dry n-heptane. The oil bath temperature was increased to 50° C. over a period of 30 mins., and reaction temperature controlled at 50° C. by use of the cold finger. A slow bleed of nitrogen (ca. 5 litres per hour) was maintained through the reactor to ensure complete absence of oxygen.

After 6 hours the catalyst was deactivated with 500 ml. methanol containing 50 ml. acetyl acetone and the polymer precipitated by pouring the resultant slurry into 3 litres of methanol.

Monomer analysis later revealed that the reaction had virtually ceased after 5 hours.

After washing with methanol and acetone at room temperature and drying under vacuum at 70° C., 575 g. copolymer, was recovered.

No external molecular weight control agent was used yet the copolymer was processed without difficulty.

By way of comparison a homopolymer of 4-methylpentene-1 was prepared in a similar fashion, but in the presence of external molecular weight control (necessary to permit processing).

The properties of the copolymer and the homopolymer are set out in the following table.

| Property | Copolymer | Homopolymer, 4MP1 |
|---|---|---|
| Tensile strength, p.s.i.: | | |
| 20° C | 4,500 | 4,000 |
| 50° C | 2,500 | 2,000 |
| 100° C | 1,500 | 1,000 |
| 130° C | 1,200 | 700 |
| Elongation at yield, percent: | | |
| 20° C | 3 | 7 |
| 100° C | 45 | 12 |
| Vicat softening point, ° C | 130–150 | 180 |
| Impact strength, 20° C., ft. lbs./in.: | | |
| Izod notched | 0.9 | 1.2 |
| Izod unnotched | 3.4 | 7.0 |
| Young's modulus, p.s.i.: | | |
| 20° C | $2.9 \times 10^5$ | $2.9 \times 10^5$ |
| 50° C | $0.5 \times 10^5$ | $0.7 \times 10^5$ |
| 100° C | $0.25 \times 10^5$ | $0.35 \times 10^5$ |
| 130° C | $0.20 \times 10^5$ | $0.25 \times 10^5$ |

What we claim is:

1. Transparent crystalline copolymer products containing units of a branched chain alpha mono-olefin containing 4–6 carbon atoms per molecule and units of a branched chain alpha octene, up to 5% of the units by weight of said products being branched chain alpha octene units.

2. Crystalline copolymer products according to claim 1 wherein the $C_4$–$C_6$ olefin is 4-methylpentene-1.

3. Crystalline copolymer products according to claim 2 wherein the branched chain alpha octene units are units of a fraction of codimerized butene-ethylene distilling between 110° C. and 111.5° C.

References Cited

UNITED STATES PATENTS 3,029,215   4/1962   Campbell _____ 260—33.6

JOSEPH L. SCHOFER, Primary Examiner

R. S. BENJAMIN, Assistant Examiner

U.S. Cl. X.R.

260—88.2

PO-1050
(5/69)

UNITED STATES PATENT OFFICE
CERTIFICATE OF CORRECTION

Patent No. 3,513,140          Dated   May 19, 1970

Inventor(s) James Keith Hambling and David Allinson Woodhead

It is certified that error appears in the above-identified patent and that said Letters Patent are hereby corrected as shown below:

In the heading of the printed specification,

Column 1, line 5, "Northern Ireland" should read:

-- England --.

SIGNED AND
SEALED
SEP 22 1970

(SEAL)
Attest:

Edward M. Fletcher, Jr.
Attesting Officer

WILLIAM E. SCHUYLER, JR.
Commissioner of Patents